US006433043B1

(12) United States Patent
Misura et al.

(10) Patent No.: US 6,433,043 B1
(45) Date of Patent: Aug. 13, 2002

(54) REMOVABLE IMBIBITION COMPOSITION OF PHOTOCHROMIC COMPOUND AND KINETIC ENHANCING ADDITIVE

(75) Inventors: Michael S. Misura, Murrysville; Anil Kumar, Pittsburgh, both of PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 09/724,145

(22) Filed: Nov. 28, 2000

(51) Int. Cl.[7] .................. C08K 3/10; C08K 5/1539; C08K 5/1545; C08K 5/3415; C08L 63/00
(52) U.S. Cl. .................. 523/456; 252/586; 523/457; 523/461; 524/104; 524/110; 524/112; 524/91; 524/96
(58) Field of Search .................. 252/586; 523/456, 523/455, 457, 461; 524/104, 110, 112, 190, 91, 96

(56) References Cited

U.S. PATENT DOCUMENTS

| 3,707,347 | A | * | 12/1972 | Mueller | 8/4 |
|---|---|---|---|---|---|
| 3,860,388 | A | * | 1/1975 | Haigh | 8/2.5 |
| 4,238,524 | A | * | 12/1980 | LaLiberte et al. | 427/7 |
| 4,271,224 | A | * | 6/1981 | Mizuno et al. | 428/207 |
| 4,286,957 | A | * | 9/1981 | Le Naour-Sene | 8/471 |
| 4,297,099 | A | * | 10/1981 | Simon et al. | 8/484 |
| 4,880,667 | A | * | 11/1989 | Welch | 427/160 |
| 5,395,566 | A | * | 3/1995 | Kobayakawa et al. | 252/586 |
| 6,057,039 | A | * | 5/2000 | Takeshita et al. | 528/14 |
| 6,268,055 | B1 | * | 7/2001 | Walters et al. | 252/586 |

FOREIGN PATENT DOCUMENTS

| DE | 3516568 A1 | * | 1/1986 |
|---|---|---|---|
| JP | 60-107030 A | * | 6/1985 |
| JP | 63-175094 A | * | 7/1988 |
| JP | 3-68584 A | * | 3/1991 |
| JP | 7-178831 A | * | 7/1995 |

* cited by examiner

Primary Examiner—Robert E. L. Sellers
(74) Attorney, Agent, or Firm—Frank P. Mallak

(57) ABSTRACT

Described are organic photochromic imbibition compositions that incorporate kinetic enhancing additive(s). Kinetic enhancing additives include epoxy-containing compounds, organic polyols and/or plasticizers that improve the performance of organic photochromic compounds as determined in the Photochromic Performance Test. Also described is a process for incorporating kinetic enhancing additives into polymeric substrates with organic photochromic compounds and the resulting photochromic articles produced by such a process.

10 Claims, No Drawings

REMOVABLE IMBIBITION COMPOSITION OF PHOTOCHROMIC COMPOUND AND KINETIC ENHANCING ADDITIVE

The present invention relates to photochromic compositions of enhanced kinetic performance and to a method for improving the performance of organic photochromic compounds in polymeric substrates. More particularly, this invention relates to improved photochromic compositions comprising organic photochromic compound(s), and optionally carrier, stabilizer and/or conventional additives wherein the improvement comprises including at least one kinetic enhancing additive. The kinetic enhancing additive is used in an amount sufficient to improve the performance of organic photochromic compounds in polymeric organic host materials, e.g., polymerizates and polymeric coatings. Still more particularly, this invention relates to photochromic articles, e.g., ophthalmic lenses, made of polymeric substrates having incorporated therein organic photochromic compounds and kinetic enhancing additives such as epoxy-containing compound(s), plasticizer(s) and/or organic polyols.

Photochromic compounds exhibit a reversible change in color when exposed to radiation including ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes are oxazines, chromenes and fulgides.

Photochromic compounds may be incorporated into plastic substrates, such as ophthalmic lenses, by various methods described in the art. Such methods include dissolving or dispersing the compound within the surface of a substrate, e.g., imbibition of the photochromic compound into the substrate by immersion of the substrate in a hot solution of the photochromic compound or by depositing the photochromic compound on the surface of the substrate and thermally transferring the photochromic compound into the substrate. The term "imbibition" or "imbibe" is intended to mean and include permeation of the photochromic compound into the substrate, solvent assisted transfer absorption of the photochromic compound into the substrate, vapor phase transfer and other such transfer mechanisms.

The extent to which the photochromic compounds penetrate the polymeric substrate generally increases with increasing temperature, increasing concentration of photochromic compounds at the surface of the polymeric substrate and increasing period of contact with the polymeric substrate. The ease with which the photochromic compounds are incorporated is also dependent upon the characteristics of the photochromic compounds and of the polymeric substrate. The molecular size, melting point and solvent solubility of the photochromic compounds as well as the receptivity of the polymeric substrate all affect the ease of incorporation of the photochromic compounds. Due to the numerous variables affecting production of photochromic articles, in some cases, photochromic compounds may not be incorporated into the plastic substrate with sufficient uniformity and to a sufficient depth. This can result in poor performance of the photochromic compound and inadequate reversible color change of the photochromic article.

Methods for incorporating photochromic compounds into polymeric substrates have been disclosed in U.S. Pat. Nos. 4,286,957, 4,880,667, 5,789,015 and 5,975,696. The use or avoidance of plasticizers in such methods is mentioned in U.S. Pat. Nos. 4,880,667 and 5,789,015. In U.S. Pat. No. 4,880,667 at column 5, line 53–58,it is stated that plasticizers may be added to the monomeric materials used to form the polymeric host to improve the diffusion of the photochromic compounds into the subsurface. In U.S. Pat. No. 5,789,015 at column 7 line 66 to column 8 line 2, an inert liquid, i.e., a liquid which does not plasticize the surface of the lens, is used to form suspensions of two photochromic additives to be impregnated into the plastic substrate. Various photochromic compositions used in the process of incorporating photochromic compounds into polymeric substrates have been disclosed in U.S. Pat. Nos. 5,185,390, 5,391,327 and 5,770,115.

The aforementioned photochromic compositions and methods of incorporating photochromic compounds into polymeric substrates are generally known in the art and can be used in the process of the present invention.

The use of epoxy-containing compounds with photochromic compounds has been disclosed in U.S. Pat. Nos. 5,395,566, 5,462,698, 5,621,017 and 5,776,376. U.S. Pat. No. 5,395,566 discloses a photochromic composition of a compound having at least one radical polymerizable group and at least one epoxy group and a photochromic compound. U.S. Pat. No. 5,462,698 discloses a photochromic composition of a compound having at least one epoxy group, a fulgide compound and two different (meth)acrylic monomers. U.S. Pat. No. 5,621,017 discloses a photochromic composition of a radical polymerization monomer, photochromic compound and photopolymerization initiator. U.S. Pat. No. 5,776,376 discloses a photochromic composition of a polymerizable monomer composed of a compound having at least one epoxy group, various monomers, an a-methylstyrene dimer and photochromic compounds.

In each of the aforedescribed patents disclosing compositions containing epoxy-containing compounds and photochromic compounds, the compositions contained radically polymerizable components and were polymerized to make photochromic lenses.

Although methods exist for incorporating photochromic compounds into polymeric substrates, improvements in such methods are sought. It has now been discovered that the use of kinetic enhancing additive in a photochromic composition comprising organic photochromic compound(s) and optionally carrier, light stabilizer(s), ultraviolet light absorber(s), antioxidant(s), rheology control agents(s) and/or leveling agent(s), improves the performance of the photochromic compound as demonstrated by an increased rating in the Photochromic Performance Test. The ratings of the test are defined as the result obtained when the change in optical density ($\Delta OD$) at 15 minutes is divided by the Bleach (T 1/2) and then multiplied by 10,000. Photochromic articles may be produced by transfer processes incorporating the improved photochromic composition of the present invention into a polymeric substrate.

DETAILED DESCRIPTION OF THE INVENTION

In accordance with the present invention, a kinetic enhancing additive is defined herein as a material which when added to a photochromic imbibition composition, results in an increased rating in the Photochromic Performance Test described in Example 29. A photochromic performance improving amount of the kinetic enhancing additive is defined herein as the amount necessary to use in the photochromic imbibition composition to result in an increased rating in the Photochromic Performance Test as compared to a photochromic imbibition composition substantially free of the kinetic enhancing additive. Materials which are kinetic enhancing additives include, but are not limited to, epoxy-containing compound(s), plasticizer(s), organic polyols and mixtures thereof.

Other than in the operating examples, or where otherwise indicated, all numbers expressing quantities of ingredients or reaction conditions used herein are to be understood as modified in all instances by the term "about".

The disclosures of the patents and articles cited herein related to photochromic compounds, plasticizers, lactone polyesters, stabilizers, poly(urea-urethanes), polymeric organic host materials, photochromic compositions, i.e., photochromic imbibition compositions, methods of incorporating photochromic compounds into a polymeric substrate and methods for producing hard or soft contact lenses are incorporated herein, in toto, by reference.

In each instance where the term "weight percent" is used herein with respect to the photochromic composition, it is to be understood that the described weight percent is based on the total weight of the photochromic composition.

Epoxy-containing compounds that may be used in the practice of the present invention may be selected from the compounds represented by the following graphic formulae I, II, III or a mixture thereof.

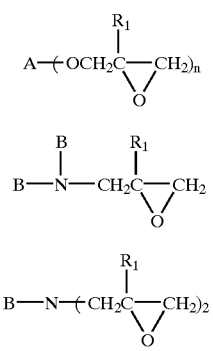

In graphic formulae I, II and II, $R_1$ is hydrogen or $C_1$–$C_3$ alkyl. Letter n is an integer selected from one, two, three or four. When n is equal to one in graphic formula I, A is selected from $C_2$–$C_{20}$ alkyl, substituted $C_2$–$C_{20}$ alkyl, $C_3$–$C_{20}$ cycloalkyl, substituted $C_3$–$C_{20}$ cycloalkyl; the unsubstituted or substituted aryl groups, phenyl and naphthyl; aryl($C_1$–$C_3$)alkyl, substituted aryl($C_1$–$C_3$)alkyl, acryloxy, methacryloxy; the group —C(O)Y, wherein Y is $C_2$–$C_{20}$ alkyl, $C_1$–$C_6$ alkoxy or aryl; or the group —R—(OR)$_m$—OH or —(OR)$_m$—OH wherein R is $C_2$–$C_4$ alkylene and m is an integer from 1 to 20. The substituents of the alkyl and cycloalkyl groups are carboxy, hydroxy and/or $C_1$–$C_3$ alkoxy. The substituents of the aryl and aryl($C_1$–$C_3$)alkyl groups are carboxy, $C_1$–$C_3$ alkoxy and/or $C_1$–$C_3$ alkyl. When n is from two to four, A is selected from $C_2$–$C_{20}$ alkylene, substituted $C_2$–$C_{20}$ alkylene, $C_3$–$C_{20}$ cycloalkylene, substituted $C_3$–$C_{20}$ cycloalkylene; the unsubstituted or substituted arylene groups, phenylene and naphthylene; aryl($C_1$–$C_3$)alkylene, substituted aryl($C_1$–$C_3$) alkylene; the group —C(O)Z(O)C—, wherein Z is $C_2$–$C_{20}$ alkylene or arylene; the group —R—(OR)$_m$— or —(OR)$_m$—, wherein R and m are the same as defined hereinbefore; phthaloyl, isophthathoyl, terephthaloyl, hydroxyl-substituted phthaloyl, hydroxy-substituted isophthaloyl, hydroxy-substituted terephthaloyl; or a group represented by the following graphic formula IV:

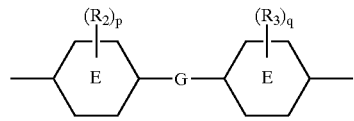

wherein $R_2$ and $R_3$ are each $C_1$–$C_4$ alkyl, chlorine or bromine; p and q are each an integer from 0 to 4;

represents a divalent benzene group or a divalent cyclohexane group; G is —O—, —S—, —S(O$_2$)—, —C(O)—, —CH$_2$—, —CH=CH—, —C(CH$_3$)$_2$—, —C(CH$_3$) (C$_6$H$_5$)—, —(C$_6$H$_4$)— or

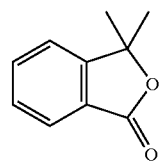

when

is the divalent benzene group; or G is —O—, —S—, —CH$_2$—, or —C(CH$_3$)$_2$—, when

is the divalent cyclohexane group. The substituents of the alkylene and cycloalkylene groups are carboxy, hydroxy and/or $C_1$–$C_3$ alkoxy. The substituents of the aryl and aryl($C_1$–$C_3$)alkylene groups are carboxy, hydroxy, $C_1$–$C_3$ alkoxy and/or $C_1$–$C_3$ alkyl.

In graphic formulae II and III, B is selected from $C_2$–$C_{20}$ alkyl, substituted $C_2$–$C_{20}$ alkyl, $C_3$–$C_{20}$ cycloalkyl, substituted $C_3$–$C_{20}$ cycloalkyl; the unsubstituted or substituted aryl groups, phenyl and naphthyl; aryl($C_1$–$C_3$)alkyl or substituted aryl($C_1$–$C_3$)alkyl. The alkyl and cycloalkyl substituent are carboxy, hydroxy and/or $C_1$–$C_3$ alkoxy. The aryl and aryl($C_1$–$C_3$) substituents are carboxy, hydroxy, $C_1$–$C_3$ alkoxy and/or $C_1$–$C_3$ alkyl.

In one contemplated embodiment, $R_1$ is hydrogen or methyl. When n is one, A is selected from $C_2$–$C_{20}$ alkyl, hydroxyl-substituted $C_2$–$C_{20}$ alkyl, $C_3$–$C_{20}$ cycloalkyl, hydroxyl-substituted $C_3$–$C_{20}$ cycloalkyl, phenyl, naphthyl, aryl($C_1$–$C_3$)alkyl; the group —C(O)Y, wherein Y is $C_2$–$C_{20}$ alkyl, $C_1$–$C_6$ alkoxy or aryl; the group —R—(OR)$_m$—OH or —(OR)$_m$—OH, wherein R is $C_2$–$C_4$ alkylene and m is an integer from 1 to 20; acryloxy or methacryloxy. When n is from two to four, A is selected from $C_2$–$C_{20}$ alkylene, hydroxyl-substituted $C_2$–$C_{20}$ alkylene, $C_3$–$C_{20}$ cycloalkylene, phenylene, naphthylene, aryl($C_1$–$C_3$) alkylene; the groups —R—(OR)$_m$— or —(OR)$_m$—, wherein R and m are the same as defined hereinbefore; phthaloyl, isophthathoyl, terephthaloyl, or a group represented by graphic formula IV wherein $R_2$ and $R_3$ are each $C_1$–$C_4$ alkyl, chlorine or bromine; p and q are each an integer from 0 to 4;

represents a divalent benzene group or a divalent cyclohexane group; G is —O—, —C(O)—, —CH$_2$—, or —(C$_6$H$_4$)— when

is the divalent benzene group, or G is —O— or —CH$_2$—, when

is the divalent cyclohexane group.

B is selected from $C_2$–$C_{20}$ alkyl, $C_3$–$C_{20}$ cycloalkyl; the unsubstituted and hydroxyl-substituted aryl groups, phenyl and naphthyl; or aryl($C_1$–$C_3$)alkyl.

In another contemplated embodiment, $R_1$ is hydrogen. When n is one, A is selected from $C_2$–$C_{10}$ alkyl, phenyl, the group —R—(OR)$_m$—OH, or —(OR)$_m$—OH, wherein R is $C_2$–$C_4$ alkylene and m is an integer from 1 to 20. When n is from two to four, A is selected from $C_2$–$C_{10}$ alkylene, phenylene, the group —R—(OR)$_m$— or —(OR)$_m$—, wherein R and m are the same as defined hereinbefore; and phthaloyl. B is selected from $C_2$–$C_{10}$ alkyl, phenyl or phenyl($C_1$–$C_3$)alkyl.

Examples of the compound having at least one epoxy group in the molecule include ethylene glycol glycidyl ether, propylene glycol glycidyl ether, glycerol polyglycidyl ether, diglycerol polyglcidyl ether, glycerol propoxylate triglycidyl ether, trimethylolpropane triglycidyl ether, sorbitol polyglycidyl ether, butyl glycidyl ether, phenyl glycidyl ether, poly(ethylene glycol)diglycidyl ether, poly(propylene glycol)diglycidyl ether, neopentyl glycol diglycidyl ether, N,N-diglycidyl-4-glycidyloxyaniline, glycidyl phthalimide, N,N-diglycidyl toluidine, 1,6-hexane diol diglycidyl ether, diglycidyl 1,2-cyclohexanedicarboxylate, bisphenol A or hydrogenated bisphenol A propylene oxide adduct, diglycidyl ester of terephthalic acid, diglycidyl 1,2,3,6-tetrahydrophthalate, spiroglycol diglycidyl ether and hydroquinone diglycidyl ether. Such compounds may be used individually or in combination as mixtures.

Plasticizers are generally known in the art of making plastic. Typically, plasticizers are incorporated during polymerization or compounding into a plastic or elastomer to increase flexibility, workability, or distensibility. The plasticizers of the present invention include the generally known classes of plasticizers except the aforementioned epoxy-containing compounds and the various organic polyols described hereinafter. Examples of the classes of plasticizers are listed in Table 117, Chemical Names of Plasticizers and their Brand Names, pp 140–188, of *Plasticizer Evaluation and Performance* by Ibert Mellan, Noyes Development Corporation, 1967; in *Ullmann's Encyclopedia of Industrial Chemistry*, Vol. 20, pp 439– 458, 1992, and in *Modern Plastics Encyclopedia*, Mid-November 1998 Issue, volume 75, Number 12, pages C-105 to C-115.

The various classes of plasticizers contemplated for use herein include: abietates, e.g. methyl abietate; acetates, e.g., glycidyl triacetate; adipates, e.g., dibutyl adipate; azelates, e.g., diisoocytyl azelate; benzoates, e.g., polyethyleneglycol dibenzoate; biphenyls, e.g., camphor; caprylates, e.g., butanediol dicaprylate; citrates, e.g., triethyl citrate; dodecanedioates, e.g., dioctyl dodecanedioate; ethers, e.g., dibenzyl ether; fumarates, e.g., diocytyl fumarate; glutarates, e.g., diisodecyl glutarate; glycolates, e.g., di(2-ethylhexyl)diglycolate; isophthalate, e.g., dimethyl isophthalate; laurates, e.g., poly(ethylene glycol)monolaurate; maleates, e.g., dibutyl maleate; myristates, e.g., isopropyl myristate; oleates, e.g., methyloleate; palmitates, e.g., tetrahydrofurfuryl palmitate; paraffin derivatives, e.g., chlomenate paraffin; phosphates, e.g., 2-ethylhexyl diphenyl phosphate; phthalates, e.g., dioctyl phthalate; ricinoleates, e.g., methoxyethyl ricinoleate; sebacates, e.g., diethyl sebacate; stearates, e.g., methylpentachlorostearate; sulfonamides, e.g., toluene sulfonamide; tartrates, e.g., butyl tartrates; terephthalates, e.g., dioctyl terephthalate; trimellitates, e.g., trioctyl trimellitate and mixtures of such plasticizers.

Examples of organic polyols that may be used in the present invention include (a) polyester polyols; (b) polyether polyols; (c) amide-containing polyols; (d) polyhydric polyvinyl alcohols; and (e) mixtures of such polyols. In one contemplated embodiment, the organic polyols are selected from polyether polyols, polyester polyols or mixtures thereof.

Polyester polyols are generally known. They are prepared by conventional techniques utilizing low molecular weight diols, triols and polyhydric alcohols known in the art (optionally in combination with monhydric alcohols) with polycarboxylic acids. Examples of such low molecular weight polyols include ethylene glycol, trimethylolpropane and pentaerythritol. Examples of suitable polycarboxylic acids include: phthalic acid, isophthalic acid, terephthalic acid, trimellitic acid, tetrahydrophthalic acid, adipic acid, succinic acid, glutaric acid, fumaric acid and mixtures thereof. Anhydrides of the above acids, where they exist, can also be employed and are encompassed by the term "polycarboxylic acid". If a triol or polyhydric alcohol is used, a monocarboxylic acid, such as acetic acid and/or benzoic acid, may be used in the preparation of the polyester polyols, and for some purposes, such a polyester polyol maybe desirable.

Moreover, polyester polyols are understood herein to include polyester polyols modified with fatty acids or glyceride oils of fatty acids (i.e., conventional alkyd polyols containing such modification). In addition, certain materials that react in a manner similar to acids to form polyester polyols are also useful. Such materials include lactones, e.g., caprolactone, propiolactone and butyrolactone, and hydroxy acids such as hydroxycaproic acid and dimethylol propionic acid. Lactone polyesters are described in U.S. Pat. No. 3,169,945. Commercially available lactone polyesters or polycaprolactone polyols are sold under the trademarks PLACCEL (Daicell Co. Ltd.) and TONE (Union Carbide). Specific examples of polycaprolactone polyols are materials obtained by the reaction of ∈caprolactone and a polyol, e.g., diol or triol.

Polyether polyols are generally known. Examples of polyether polyols include various polyoxyalkylene polyols, polyalkoxylated polyols, e.g., poly(oxytetramethylene)

diols, and mixtures thereof. The polyoxyalkylene polyols can be prepared, according to well-known methods, by condensing alkylene oxide, or a mixture of alkylene oxide using acid or base catalyzed addition, with a polyhydric initiator or a mixture of polyhydric initiators such as ethylene glycol, propylene glycol, glycerol, sorbitol and the like. Illustrative alkylene oxides include ethylene oxide, propylene oxide, butylene oxide, amylene oxide, aralkylene oxides, e.g., styrene oxide, and the halogenated alkylene oxides such as trichlorobutylene oxide and so forth. The more preferred alkylene oxides include propylene oxide and ethylene oxide or a mixture thereof using random or stepwise oxyalkylation. Examples of such polyoxyalkylene polyols include polyoxyethylene, i.e., polyethylene glycol, polyoxypropylene, i.e., polypropylene glycol.

Polyalkoxylated polyols may be represented by the following graphic formula V,

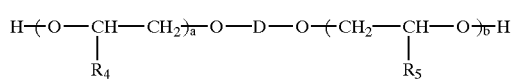

wherein a and b are each a positive number, the sum of a and b being from 2 to 70, $R_4$ and $R_5$ are each hydrogen, methyl or ethyl, preferably hydrogen or methyl and D is a divalent linking group selected from straight or branched chain alkylene (usually containing from 1 to 8 carbon atoms), phenylene, $C_1$–$C_9$ alkyl substituted phenylene or a group represented by the aforementioned graphic formula IV. Such materials may be prepared by methods that are well known in the art. One such commonly used method involves reacting a polyol, e.g., 4,4'-isopropylidenediphenol, with an oxirane containing substance, for example ethylene oxide, propylene oxide, α-butylene oxide or β-butylene oxide, to form what is commonly referred to as an ethoxylated, propoxylated or butoxylated polyol having hydroxy functionality.

Examples of polyols suitable for use in preparing the polyalkoxylated polyols include low molecular weight polyols; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, and 4-hydroxybenzyl alcohol; dihydroxybiphenyls such as 4,4'-dihydroxybiphenyl and 2,2'-dihydroxybiphenyl; bisphenols such as 4,4'-isopropylidenediphenol; 4,4'-oxybisphenol; 4,4'-dihydroxybenzenephenone; 4,4'-thiobisphenol; phenolphthalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidene-biscyclohexanol; 4,4'-oxybiscyclohexanol; 4,4'-thiobiscyclohexanol; and bis(4-hydroxycyclohexanol)methane.

The polyether polyols also include the generally known poly(oxytetramethylene)diols or polytetrahydrofuran diols prepared by the polymerization of tetrahydrofuran in the presence of Lewis acid catalysts such as boron trifluoride, tin (IV) chloride and sulfonyl chloride.

In one contemplated embodiment, the polyether polyols are selected from the group polyoxyalkylene polyols, polyalkoxylated polyols, poly(oxytetramethylene)diols or mixtures thereof.

Amide-containing polyols are generally known and typically are prepared from the reaction of diacids or lactones and low molecular weight polyols, e.g., aliphatic diols, triols, etc., with diamines or aminoalcohols as described hereinafter. For example, amide-containing polyols may be prepared by the reaction of neopentyl glycol, adipic acid and hexamethylenediamine. The amide-containing polyols may also be prepared through aminolysis by the reaction, for example, of carboxylates, carboxylic acids, or lactones with amino alcohols. Examples of suitable diamines and amino alcohols include hexamethylenediamines, ethylenediamines, phenylenediamine, monoethanolamine, diethanolamine, isophorone diamine and the like.

Polyhydric polyvinyl alcohols are generally known and can be prepared, for example, by the polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers.

The amount of kinetic enhancing additive used in the photochromic composition is not critical provided that it is a photochromic performance improving amount. Such an amount may range from 0.1 to 99.9 weight percent of the photochromic composition. In one contemplated embodiment, the amount of kinetic enhancing additive ranges from 1 to 75 weight percent of the photochromic composition. In another contemplated embodiment, the amount of kinetic enhancing additive ranges from 2 to 50 weight percent. In a still further contemplated embodiment, the amount of kinetic enhancing additive ranges from 3 to 30 weight percent. The amount of kinetic enhancing additive used may range between any combination of these values, inclusive of the recited ranges, e.g., from 0.15 to 99.85 weight percent, provided that the amount used is a photochromic performance improving amount.

The improvement in the photochromic performance resulting from the addition of the kinetic enhancing additive to the photochromic composition is evident by a higher rating in the Photochromic Performance Test than that of a composition without the kinetic enhancing additive. The percent improvement can be determined by subtracting the rating of the composition without kinetic enhancing additive from the rating of the composition with the kinetic enhancing additive, dividing the result by the rating of the composition without kinetic enhancing additive and multiplying by 100. The higher the percent improvement, the greater the effect of the kinetic enhancing additive and the more desirable the result. For example, percent improvements of 10, 15, 20, 30, 50, 90, 100, 200, 500, 1000, 1500 and higher are more desirable than percent improvements of from 1 to less than 10.

The photochromic compounds used in the photochromic composition of the present invention may be used alone or in combination with one of more other appropriate complementary organic photochromic compounds, i.e., organic photochromic compounds having at least one activated absorption maxima within the range of 400 and 700 nanometers, and which color when activated to an appropriate hue.

The complementary organic photochromic compounds may include polymerizable photochromic compounds, such as those disclosed in U.S. Pat. Nos. 4,719,296; 5,166,345; 5,236,958; 5,252,742; 5,359,085; and 5,488,119. Further examples of complementary organic photochromic compounds include naphthopyrans, e.g., naphtho[1,2-b]pyrans and naphtho[2,1-b]pyrans, quinopyrans, indenonaphthopyrans, oxazines, e.g., benzoxazines, naphthoxazines and spiro(indoline)pyridobenzoxazines, phenanthropyrans, e.g., substituted 2H-phenanthro[4,3-b]pyran and 3H-phenanthro[1,2-b]pyran compounds, benzopyrans, e.g., benzopyran compounds having substituents at the 2-position of the pyran ring, and mixtures of such photochromic compounds. Such photochromic compounds are described in U.S. Pat. Nos. 3,562,172; 3,567,605; 3,578,602; 4,215,010; 4,342,668; 4,816,584; 4,818,096; 4,826,977; 4,880,667; 4,931,219; 5,066,818; 5,238,981; 5,274,132; 5,384,077; 5,405,958; 5,429,774; 5,458,814; 5,466,398; 5,514,817; 5,552,090; 5,552,091; 5,565,147; 5,573,712; 5,578,252; 5,637,262; 5,645,767; 5,656,206; 5,658,500; 5,658,501; 5,674,432 and 5,698,141. Spiro(indoline) pyrans are also described in the text, *Techniques in Chemistry,* Volume III, "Photochromism", Chapter 3, Glenn H. Brown, Editor, John Wiley and Sons, Inc., New York, 1971.

Other complementary photochromic substances contemplated are metal-dithiozonates, e.g., mercury dithiozonates which are described in, for example, U.S. Pat. No. 3,361,706; and fulgides and fulgimides, e.g., the 3-furyl and 3-thienyl fulgides and fulgimides, which are described in U.S. Pat. No. 4,931,220 at column 20, line 5 through column 21, line 38.

The photochromic articles of the present invention may contain one photochromic compound or a mixture of photochromic compounds, as desired.

Each of the photochromic substances described herein may be used in amounts (or in a ratio) such that a polymeric substrate to which the photochromic composition is associated, exhibits a desired resultant color, e.g., a substantially neutral color when activated with unfiltered sunlight, i.e., as near a neutral color as possible given the colors of the activated photochromic compounds. Neutral gray and neutral brown colors are preferred. Further discussion of neutral colors and ways to describe colors may be found in U.S. Pat. No. 5,645,767 column 12, line 66 to column 13, line 19.

The amount of the photochromic compounds to be used in the photochromic composition, which is incorporated into a polymeric organic host material, is not critical provided that a sufficient amount is used to produce a photochromic effect discernible to the naked eye upon activation. Generally, such amount can be described as a photochromic amount. The particular amount used depends often upon the intensity of color desired upon irradiation thereof and upon the method used to incorporate the photochromic composition. Typically, the more photochromic compound incorporated, the greater is the color intensity up to a certain limit.

The relative amounts of the aforesaid photochromic compounds used will vary and depend in part upon the relative intensities of the color of the activated species of such compounds, the ultimate color desired and the method of application of the photochromic composition to the polymeric substrate. In a typical commercial imbibition process, the amount of total photochromic compound incorporated into a receptive polymeric substrate may range from about 0.05 to about 2.0, e.g., from 0.2 to about 1.0, milligrams per square centimeter of surface to which the photochromic compound is incorporated or applied.

The amount of photochromic compound incorporated into the photochromic composition may range from 0.1 to 99.9 weight percent based on the weight of the composition. In one series of contemplated embodiments in which the photochromic composition is a combination of kinetic enhancing additive and photochromic compound, the amount of photochromic compound ranges from 25 to 99 weight percent, from 50 to 98 weight percent or from 70 to 97 weight percent. The amount of photochromic compounds used in the photochromic composition of the present invention may range between any combination of these values, inclusive of the recited ranges, e.g., from 0.15 to 99.85 weight percent.

In another series of contemplated embodiments in which there are three or more components in the photochromic composition, the amount of photochromic compound is equivalent to the amount of kinetic enhancing additive, e.g., 5 weight percent of each; is less than the amount of kinetic enhancing additive, e.g., 4 weight percent photochromic and 16 weight percent kinetic enhancing additive; or is more than the amount of kinetic enhancing additive, e.g., 40 weight percent photochromic compound and 10 weight percent kinetic enhancing additive. The sum of all the components in the photochromic composition is 100 percent.

The optional carrier of the present invention may be a solvent, i.e., an aqueous solvent, organic solvent or mixture of such solvents, a polymeric resin or a mixture of solvents and polymeric resin. Examples of solvent-carriers include water, benzene, toluene, methyl ethyl ketone, acetone, ethanol, tetrahydrofurfuryl alcohol, n-methylpyrrolidone, 2-ethoxyethyl ether, 2-methoxyethyl ether, xylene, cyclohexane, 3-methyl cyclohexanone, ethyl acetate, tetrahydrofuran, methanol, methyl propionate, ethylene glycol, acetonitrile, butanol, methylisobutyl ketone, methylchloroform, isopropanol and mixtures of such solvents. Examples of polymeric resins include hydroxy $(C_1-C_3)$alkyl celluloses, poly(vinyl pyrrolidone) (PVP); mixtures of from 5 to 50 parts of hydroxy $(C_1-C_3)$alkyl celluloses and from 95 to 50 parts of PVP, polyvinyl chloride, polyvinyl acetate, polyvinylbutyral, copolymers of vinyl chloride and vinyl acetate, copolymers of vinyl chloride and vinylidene chloride, polyvinyl propionate, cellulose acetate butyrate, and mixtures of such polymeric resins.

When the carrier is a solvent, the photochromic composition may be deposited on the surface of the polymeric substrate using a single step imbibition process or a multiple step process which may include high boiling liquids and the application of ultrasonic energy as described in U.S. Pat. No. 5,789,015; the photochromic composition may be applied to a temporary support such as a sheet of paper which is placed directly on the polymeric substrate as described in U.S. Pat. No. 4,286,957; the photochromic composition may utilize a non-polar solvent, which is used in a two-layer immersion bath as described in U.S. Pat. No. 5,975,696; or the photochromic composition may be used in a different method known in the art for transferring photochromic compositions into polymeric substrates.

When the carrier in the photochromic composition includes a polymeric resin, the resin essentially serves as a film-forming binder for the other components of the composition. The affinity between the carrier and the other components, i.e., the solubility of the photochromic compounds and the kinetic enhancing additive in the carrier, should be sufficient to form a homogeneous solution and permit ready removal or transfer of these compounds from the resin film at the aforementioned concentrations. Also, the polymeric resin should not adhere strongly to the polymeric substrate to which it is applied so that it can be readily removed from the surface of the substrate without leaving marks on the surface.

Adjuvant materials may also be incorporated into the photochromic composition. For example, ultraviolet light absorbers and/or stabilizers may be included in the photochromic composition to improve the fatigue resistance of the photochromic substances. Adjuvants, such as hindered amine light stabilizers (HALS), antioxidants, e.g., polyphenolic antioxidants, ultraviolet light absorbers, such as asymmetric diaryloxalamide (oxanilide) compounds, and singlet oxygen quenchers, e.g., a nickel ion complete with an organic ligand, or mixtures of such materials are contemplated. They may be used alone, in combination or in combination with the additional conventional ingredients described hereinafter. Such stabilizers are described in U.S. Pat. Nos. 4,720,356, 5,391,327 and 5,770,115.

The photochromic compositions used in the process of the present invention may further comprise additional conventional ingredients that impart desired physical characteristics to the composition or the resultant layer; that are required for the process used to apply the photochromic composition to the substrate; and/or that enhance the layer made therefrom. Such additional ingredients include rheology control agents, e.g., silica, and leveling agents, e.g., surfactants.

The photochromic composition, i.e., the photochromic compound(s), kinetic enhancing additive and optional ingredients, can be prepared by any conventional technique. For example, the individual components may be mixed and used neat or may be dissolved in appropriate solvents before combining or each of the components may be sequentially dissolved or incorporated into a suitable carrier, with heat, if necessary.

The photochromic composition is applied to at least one principal surface, i.e., a flat or curved surface other than the side corresponding to the thickness of the imbibition-receiving surface of the polymeric host by techniques known in the art that are suitable to produce a mottle-free coating or film of uniform thickness. In one contemplated embodiment, the composition is applied in such a manner that the resulting film is substantially dry as soon as it is formed, i.e., the readily vaporizable solvent is substantially volatilized as the composition is applied to the receptor surface of the plastic host, thereby leaving a substantially dry film. Application techniques that may be employed include spraying, brushing, curtain coating, spin-coating, dip coating and use of a draw-down blade or wire bar.

Before applying the photochromic composition to the polymeric host, the surface of the polymer to which the composition is to be applied is preferably cleaned. Cleaning may be accomplished by washing the surface with an aqueous medium, e.g., soapy water, to remove dust and dirt; washing the surface with an organic solvent such as methylethylketone to remove any organic film present on the surface; and/or eliminating static charges that are present on the surface of the plastic material. Elimination of static electricity can be accomplished by commercially available equipment which ionize the air above the surface, thereby producing a conductive path which allows the static charge to drain off or otherwise be neutralized.

The surface of the plastic material to which the photochromic composition is applied should be receptive to imbibition of the photochromic compound(is) and kinetic enhancing additive during the heating step. If the receptor surface is not amenable to imbibition, it can be treated to permit improved diffusion of the photochromic composition into the subsurface of the polymeric host, e.g., by physically or chemically etching the surface. A receptive surface can be achieved usually by undercuring slightly the polymer during its formation. Such techniques are conventional in the polymerization art.

Following application of the photochromic-composition to the surface(s) of the polymeric organic host material, the substantially dry film or coating is permitted to completely dry. Drying can be conveniently conducted at room temperature in air; but, other conditions of drying which avoid crystallization of the photochromic compound within the resin film or coating may be used as the occasion warrants. Thereafter, the coated polymeric article is heated substantially uniformly at temperatures below the boiling temperature of the photochromic compound used. Heating can be accomplished by any convenient technique that results in substantially uniform heating of the coated polymeric host. In one contemplated embodiment, heating is accomplished in a conventional hot air recirculating oven, which allows for uniform heating and hence a constant driving force for transfer of the photochromic compound and kinetic enhancing additive into the polymeric host. Heating may also be accomplished in a vacuum or with use of an inert, e.g., nitrogen atmosphere.

The temperatures to which the coated polymeric article is heated will vary and depend on the boiling point and vapor pressure of the particular photochromic compound and kinetic enhancing additive utilized as well as the softening temperature of the synthetic polymeric article. Such temperatures should preferably be near to but below the boiling point of the photochromic compound and kinetic enhancing additive and below the softening temperature of the synthetic polymeric article. Moreover, such temperatures, i.e., photochromic transfer or incorporation temperatures, should be such as to avoid decomposition (pyrolysis) of the photochromic compound, as well as the kinetic enhancing additive. Hence, the transfer temperatures chosen are sufficient to raise the vapor pressure of the photochromic compound and kinetic enhancing additive adequately to permit its transfer into the polymeric host without significant decomposition to the compounds and softening of the polymeric host.

As the boiling points and vapor pressures of kinetic enhancing additive and photochromic compounds, e.g., chromene-type photochromic compounds, will vary depending on the nature of the compound and their substituents, one temperature range applicable to all photochromic compositions cannot be described. However, given the above requirements one skilled in the art can readily determine an appropriate temperature for heating the coated polymeric article. Transfer temperatures of between 5° C. and 50° C., less than the boiling temperature of the photochromic compound and the kinetic enhancing additive are contemplated except where significant decomposition of the compounds is experienced at such temperatures. Generally, in the imbibition art, temperatures used in association with organic photochromic compounds and polymeric lenses are between 100° C. and 160° C. In one contemplated embodiment, a transfer temperature of between 5 and 10° C. less than the boiling temperature of the photochromic compound and other transferable components is used.

The coated polymeric article is maintained at the above-described transfer temperatures, for a time sufficient to allow a substantial portion, i.e., a photochromic amount, of the photochromic compound and a photochromic performance improving amount of kinetic enhancing additive, to diffuse into and penetrate beneath the surface of the plastic article. Typically, the heating period in commercial imbibition processes is from one hour to twelve hours, usually between four and nine hours at the transfer temperatures.

The mechanism by which the photochromic compound and the kinetic enhancing additive transfer from the resin film or coating adhered to the surface of the polymeric host into the polymeric host material has not been established with certainty. It is postulated that thermal diffusion, sublimation and condensation or a combination of the aforesaid mechanisms may accomplish transfer. Whatever the specific mechanism(s), the photochromic compound and the kinetic enhancing additive permeate into the polymeric substrate, usually into the subsurface regions thereof, and become incorporated within the polymeric host material. In this manner, a photochromic amount of the photochromic substance and a photochromic performance improving amount of kinetic enhancing additive are transferred into and across the planar surface of the plastic host.

Following transfer of the photochromic and kinetic enhancing additive into the polymeric article, the coated polymer is allowed to cool, e.g., to room temperature, and subsequently the residual resin film, its concentration of the photochromic compounds and kinetic enhancing additive reduced, is removed from the surface of the polymeric host. Removal of the photochromic compound and kinetic enhancing additive-depleted film may be accomplished by any suitable technique; preferably a technique that does not impair the optical quality of the surface of the plastic. Conveniently, the depleted film is stripped from the polymeric substrate by contacting the film with a suitable solvent such as soapy water or organic solvents such as trichloroethylene, methylethylketone, methylisobutylketone, methylethylketone-toluene mixture, or other solvents such as: acetone, ethylene dichloride, chloroform and chlorobenzenes. The same solvent used to prepare the photochromic composition may be used to remove the residual resin film.

A suitable method for contacting the film or coating with organic solvent is in a vapor degreasing unit wherein the coated substrate is exposed to the vapors of the selected solvent(s) which condense on and run off the surface of the polymeric material, thereby washing the photochromic and kinetic enhancing additive-depleted resin film or coating from the surface. Alternatively, the resin film or coating can be removed by dipping the polymeric substrate into a bath of the solvent, spraying the solvent on the coated substrate or physically stripping the film or coating from the substrate. After the photochromic and kinetic enhancing additive-depleted or spent film or coating has been removed from the surface of the polymeric article, the surface can be washed with water, solvent or a suitable aqueous medium such as, for example, soap or detergent solutions and dried. If desired, the polymeric article can be tinted with conventional disperse and soluble dyes used in the tinting of organic plastic materials using techniques well known in the art, e.g., a conventional dye bath. Thereafter, the tinted polymeric article is washed, e.g., with soapy water, and dried. Tinting of the polymeric article can be performed immediately after removal of the spent resin film or coating and before cleaning the surface. Alternatively, tinting can be performed before the photochromic composition is applied.

The polymeric host material will usually be transparent, but may be translucent or even opaque. The host material need only be pervious to that portion of the electromagnetic spectrum, which activates the photochromic substance, i.e., that wavelength of ultraviolet (UV) light that produces the open or colored form of the substance and that portion of the visible spectrum that includes the absorption maximum wavelength of the substance in its UV activated form, i.e., the open form.

In one contemplated embodiment, the color of the host is such that it does not mask the color of the activated form of the photochromic compounds, i.e., so the change in color is readily apparent to the observer. In another contemplated embodiment, the polymeric organic host material is a solid transparent or optically clear material, e.g., materials suitable for optical applications, such as plano, ophthalmic and contact lenses, windows, automotive transparencies, e.g., windshields, aircraft transparencies, plastic sheeting, polymeric films, etc.

One polymeric organic host material which may be used with the photochromic imbibition composition described herein is a non-elastomeric poly(urea-urethane). Non-elastomeric poly(urea-urethane) is defined herein as the reaction product of reactants comprising (a) at least one polyol, e.g., diol; (b) at least one polyisocyanate having at least two isocyanato groups; (c) at least one polyamine having at least two amino groups, each amino group being independently selected from primary amino and secondary amino; and optionally, (d) at least one polyol having at least three hydroxyl groups. In one contemplated embodiment, the number of isocyanato groups of the isocyanate reactants is greater than the number of hydroxyl groups of the polyol reactants.

The preparation of poly(urea-urethane) is described in U.S. patent. application Ser. No. 09/499,054, filed Feb. 4, 2000 and in U.S. Pat. Nos. 3,866,242; 5,811,506; 5,962,617; and 5,962,619.

Examples of additional polymeric organic host materials which may be used with the photochromic composition described herein include: polymers, i.e., homopolymers and copolymers, of polyol(allyl carbonate) monomers, e.g., diethylene glycol bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bismethacrylate monomers, alkoxylated polyhydric alcohol acrylate monomers, such as ethoxylated trimethylol propane triacrylate monomers, diallylidene pentaerythritol monomers, urethane acrylate monomers, such as those described in U.S. Pat. No. 5,373,033, and vinylbenzene monomers, such as those described in U.S. Pat. No. 5,475,074 and styrene; polymers, i.e., homopolymers and copolymers, mono- or polyfunctional, e.g., di- or multi-functional, acrylate and/or methacrylate monomers, poly($C_1$–$C_{12}$ alkyl methacrylates), such as poly (methyl methacrylate), poly(oxyalkylene)dimethacrylate, poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, polythiourethanes, thermoplastic polycarbonates, polyesters, poly(ethylene terephthalate), polystyrene, poly(alpha methylstyrene), copoly(styrene-methyl methacrylate), copoly(styrene-acrylonitrile), polyvinylbutyral and polymers, i.e., homopolymers and copolymers, of diallylidene pentaerythritol, particularly copolymers with polyol (allyl carbonate) monomers, e.g., diethylene glycol bis(allyl carbonate), and acrylate monomers, e.g., ethyl acrylate, butyl acrylate. Further examples of polymeric organic host materials are disclosed in the U.S. Pat. No. 5,753,146, column 8, line 62 to column 10, line 34.

Transparent copolymers and blends of transparent polymers are also suitable as host materials. In one contemplated embodiment, the host material or substrate for the photochromic composition is an optically clear polymerized organic material prepared from a thermoplastic polycarbonate resin, such as the carbonate-linked resin derived from bisphenol A and phosgene, which is sold under the trademark, LEXAN; a polyester, such as the material sold under the trademark, MYLAR; a poly(methyl methacrylate), such as the material sold under the trademark, PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, such as copolymers with vinyl acetate, e.g., copolymers of from 80–90 percent diethylene glycol bis(allyl carbonate) and 10–20 percent vinyl acetate, particularly 80–85 percent of the bis(allyl carbonate) and 15–20 percent vinyl acetate, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups, as described in U.S. Pat. No. 5,200,483; poly(vinyl acetate), polyvinylbutyral, polyurethane, polymers of diethylene glycol dimethacrylate monomers, diisopropenyl benzene monomers, ethoxylated bisphenol A dimethacrylate monomers, ethylene glycol bismethacrylate monomers, poly (ethylene glycol) bismethacrylate monomers, ethoxylated phenol bismethacrylate monomers and ethoxylated trimethylol propane triacrylate monomers; cellulose acetate, cellulose propionate, cellulose butyrate, cellulose acetate butyrate, polystyrene and copolymers of styrene with methyl methacrylate, vinyl acetate and acrylonitrile.

More particularly contemplated is use of the photochromic composition of the present invention with optical organic resin monomers used to produce optically clear polymeric coatings and polymerizates, i.e., materials suitable for optical applications, such as lenses for use in a pair of spectacles, e.g., plano or ophthalmic spectacle lenses, or for use as contact lenses. Optically clear polymerizates may have a refractive index that may range from about 1.35 to about 1.75, e.g., from about 1.495 to about 1.66.

Other examples of polymeric organic host materials are thermoplastic or thermosetting coatings described in the *Kirk-Othmer Encyclopedia of Chemical Technology*, Fourth Edition, Volume 6, pages 669 to 760. In one contemplated embodiment, thermosetting coatings are used. The polymeric coating applied to the surface of the substrate and imbibed with the photochromic composition of the present invention may be a coating that upon curing forms a polymeric layer selected from polyurethanes, aminoplast resins, poly(meth)acrylates, e.g., polyacrylates and polymethacrylates, polyanhydrides, polyacrylamides, or epoxy resins, e.g., polyacid cured epoxy resins.

Specifically contemplated as host materials are polymerizates of Spectralite® lenses sold by Sola International, TRIVEX™ lenses and optical resins sold by PPG Industries, Inc. under the CR- designation, e.g., CR-307 and CR-407, and polymerizates prepared for use as hard or soft contact lenses. Methods for producing both types of contact lenses are disclosed in U.S. Pat. No. 5,166,345, column 11, line 52, to column 12, line 52. Additional polymerizates contemplated for use with the photochromic compositions of the present invention are polymerizates used to form soft contact lenses with high moisture content described in U.S. Pat. No. 5,965,630 and extended wear contact lenses described in U.S. Pat. No. 5,965,631.

Photochromic articles prepared using the photochromic composition of the present invention may be coated with a silica, titania, and/or zirconia-based hard coating material. Alternatively, an organic hard coating material of the ultraviolet curable type may be applied so as to form a hard surface layer. Application of such protective coatings, e.g., abrasion resistant coatings, may be by any of the methods used in coating technology such as, for example, spray coating, spin coating, spread coating, curtain coating, dip coating or roll-coating. Other coatings and/or surface treatments, e.g., antireflective surface, hydrophobic coating, etc., may also be applied individually or sequentially to at least one surface of the photochromic articles of the present invention. An antireflective coating, e.g., a monolayer or multilayer of metal oxides, metal fluorides, or other materials, may be deposited onto the photochromic articles, e.g., lenses, of the present invention through vacuum evaporation, sputtering, or some other method.

The present invention is more particularly described in the following examples that are intended as illustrative only, since numerous modifications and variations therein will be apparent to those skilled in the art.

Examples 1 to 4 and Comparative Example 1 demonstrate the effects on the Photochromic Performance Rating of including 5 grams or 4 weight percent of polyethylene glycol diglycidyl ether (PEG(DGE)) in a photochromic imbibition composition as compared to an imbibition composition without PEG(DGE) and the effects of increasing the amount of PEG(DGE) by 5 gram increments to 20 grams or 16 weight percent in the photochromic composition.

EXAMPLE 1

The following materials were added in the order and the manner described to a container suitable for use with a BRINKMAN PT-3000 homogenizer:

| Material | Weight (grams) |
| --- | --- |
| Charge-1 | |
| 2-Ethoxy ethyl ether | 50.0 |
| Tetrahydrofurfuryl alcohol | 30.0 |
| n-Methyl pyrrolidone | 20.0 |
| PEG(DGE)[1] | 5.0 |
| Hydroxypropyl cellulose | 12.0 |
| Silica | 0.9 |
| Charge-2 | |
| Photochromic No. 1[2] | 4.3 |
| Photochromic No. 2[3] | 1.7 |
| SANDUVOR® 3056 UV stabilizer[4] | 1.8 |
| IRGANOX® 3114 antioxidant[5] | 1.2 |

[1]Polyethylene glycol diglycidyl ether having a number average molecular weight of 526.
[2]A naphtho[1,2-b]pyran that exhibits a blue color when irradiated with ultraviolet light.
[3]A naphtho[1,2-b]pyran that exhibits a yellow color when irradiated with ultraviolet light.
[4]Hindered amine ultraviolet light stabilizer available from Sandoz Chemical Corp.
[5]A polyphenolic antioxidant available from Ciba-Geigy Corporation.

Charge 1 was added to the container and mixed by the homogenizer at a speed of 5000 rpm for 2 minutes or until the materials were dissolved. Charge-2 was then added to the container and the resulting mixture was heated and mixed until the materials were dissolved.

EXAMPLE 2

The procedure of Example 1 was followed except that the amount of PEG(DGE) added was 10.0 grams.

EXAMPLE 3

The procedure of Example 1 was followed except that the amount of PEG(DGE) added was 15.0 grams

EXAMPLE 4

The procedure of Example 1 was followed except that the amount of PEG(DGE) added was 20.0 grams.

Comparative Example 1

The procedure of Example 1 was followed except that PEG(DGE) was not included in the imbibition formulation.

Examples 5–11 and Comparative Example 2 demonstrate the effects on the Photochromic Performance Rating of including several different kinetic enhancing additives, individually, in a photochromic imbibition composition containing different photochromic compounds and stabilizers than used for Examples 1–4 and Comparative Example 1.

EXAMPLE 5

The procedure of Example 1 was followed except that in Charge 1, polyethylene glycol diglycidyl ether was replaced with an equal amount of trimethylolpropane triglycidyl ether (TMPTGE) having a formula weight (FW) of 302; and Charge-2 was replaced by the following compounds in the amounts specified:

| Material | Weight (grams) |
| --- | --- |
| Photochromic No. 3[6] | 2.28 |
| Photochromic No. 4[7] | 0.48 |
| Photochromic No. 5[8] | 0.54 |
| Photochromic No. 6[9] | 2.70 |
| TINUVIN ® 144 UV Stabilizer[10] | 2.10 |
| IRGANOX ® 3114 Antioxidant | 0.90 |

[6]A photochromic naphtho[1,2-b]pyran that exhibits a blue color when irradiated with ultraviolet light.
[7]A photochromic naphtho[1,2-b]pyran that exhibits a blue-green color when irradiated with ultraviolet light.
[8]A photochromic naphtho[1,2-b]pyran that exhibits a yellow-orange color when irradiated with ultraviolet light.
[9]A photochromic naphtho[1,2-b]pyran that exhibits a yellow-orange color when irradiated with ultraviolet light.
[10]Hindered amine ultraviolet light stabilizer available from Ciba-Geigy Corporation.

EXAMPLE 6

The procedure of Example 5 was followed except that trimethylolpropane triglycidyl ether was replaced by an equal amount of N,N-diglycidyl-4-glycidyloxyaniline (DGGA) having a FW of 277.

EXAMPLE 7

The procedure of Example 5 was followed except that trimethylolpropane triglycidyl ether was replaced by an equal amount of diglycidyl-1,2,3,6-tetrahydrophthalate (DGTP) having a FW of 282.

EXAMPLE 8

The procedure of Example 5 was followed except that trimethylolpropane triglycidyl ether was replaced by an equal amount of poly(ethylene glycol)diglycidyl ether (PEG(DGE)) having a number-average molecular weight of 526.

EXAMPLE 9

The procedure of Example 5 was followed except that trimethylolpropane triglycidyl ether was replaced by an equal amount of poly(propylene glycol)diglycidyl ether (PPG(DGE)) having a number-average molecular weight of 380.

EXAMPLE 10

The procedure of Example 5 was followed except that trimethylolpropane triglycidyl ether was replaced by an equal amount of polycaprolactone diol (PCLD) having an number-average molecular weight of 530.

EXAMPLE 11

The procedure of Example 5 was followed except that trimethylolpropane triglycidyl ether was replaced by an equal amount of poly(ethylene glycol)monolaurate (PEGML) having a number-average molecular weight of 400.

Comparative Example 2

The procedure of Example 5 was followed except that trimethylolpropane triglycidyl ether was not included in the imbibition formulation.

Examples 12–22 and Comparative Example 3 demonstrate the effects on the Photochromic Performance Rating of using several different kinetic enhancing additives, individually, in a photochromic imbibition composition containing a mixture of some of the photochromic compounds and additives used in the imbibition composition of the previous two sets of examples and comparative examples.

EXAMPLE 12

The procedure of Example 5 was followed except that the following materials were used in Charge 2.

| Material | Weight (grams) |
| --- | --- |
| Photochromic No. 7[10] | 2.16 |
| Photochromic No. 8[11] | 0.54 |
| Photochromic No. 2 | 3.00 |
| Photochromic No. 5 | 0.30 |
| Tinuvin ® 144 UV Stabilizer | 0.60 |
| Irganox ® 3114 Antioxidant | 1.2 |
| Sanduvor 3058 UV Stabilizer[12] | 1.2 |

[10]A photochromic naphtho[1,2-b]pyran that exhibits a blue-gray color when irradiated with ultraviolet light.
[11]A photochromic spironaphthoxazine that exhibits a green-blue color when irradiated with ultraviolet light.
[12]Hindered amine ultraviolet light stabilizer available from Sandoz Chemical Corporation.

EXAMPLE 13

The procedure of Example 12 was followed except that trimethylolpropane triglycidyl ether was replaced with an equal amount of glycerol propoxylate triglycidyl ether (GPTGE) having an Epoxide equivalent weight of 620–680.

EXAMPLE 14

The procedure of Example 12 was followed except that trimethylolpropane triglycidyl ether was replaced with an equal amount of N,N-diglycidyl-4-glycidyloxy aniline (DGGA) having a FW of 277.

EXAMPLE 15

The procedure of Example 12 was followed except that trimethylolpropane triglycidyl ether was replaced with an equal amount of diglycidyl-1,2,3,6-tetrahydrophthalate (DGTP) having a FW of 282.

EXAMPLE 16

The procedure of Example 12 was followed except that trimethylolpropane triglycidyl ether was replaced with an equal amount of diglycidyl-1,2-cyclohexanedicarboxylate (DGCHDC) having a FW of 284.

EXAMPLE 17

The procedure of Example 12 was followed except that trimethylolpropane triglycidyl ether was replaced with an equal amount of poly(ethylene glycol)diglycidyl ether (PEG (DGE)) having a number-average molecular weight of 526.

EXAMPLE 18

The procedure of Example 12 was followed except that trimethylolpropane triglycidyl ether was replaced with an equal amount of polycaprolactone diol (PCLD) having a number-average molecular weight of 530.

EXAMPLE 19

The procedure of Example 12 was followed except that trimethylol propane triglycidyl ether was replaced with an equal amount of poly(ethylene glycol) (PEG-600) having an number-average molecular weight of 600.

EXAMPLE 20

The procedure of Example 12 was followed except that trimethylol propane triglycidyl ether was replaced with an equal amount of TERETHANE® 650 polyether glycol (PTHF) reported to be polytetrahydrofuran linear-chain polymer having a number-average molecular weight of 650.

EXAMPLE 21

The procedure of Example 12 was followed except that trimethylol propane triglycidyl ether was replaced with an equal amount of poly(ethylene glycol) (PEG-900) having an number-average molecular weight of 900.

EXAMPLE 22

The procedure of Example 12 was followed except that trimethylol propane triglycidyl ether was replaced with an equal amount of Benzoflex P-200 reported to be a polyethylene glycol dibenzoate (PEGDB).

Comparative Example 3

The procedure of Example 12 was followed except that trimethylolpropane triglycidyl ether was not included in the imbibition formulation.

Examples 23–28 and Comparative Examples 4–7 demonstrate the effects on the Performance Rating of including different kinetic enhancing additives in the photochromic imbibition compositions for two different non-elastomeric urea-urethane lenses.

EXAMPLE 23

Part A

The following materials were added in the order and the manner described to a suitable reaction vessel equipped with an agitator, a thermometer, nitrogen inlet and heat/cooling capabilities.

| Material | Number of Equivalents |
|---|---|
| PCLD (400 EW)[13] | 0.740 |
| PCLD (200 EW)[14] | 0.115 |
| PCLD (1000 EW)[15] | 0.025 |
| Trimethylolpropane | 0.120 |
| DESMODUR W[16] | 2.700 |

[13]Polycaprolactone diol having an equivalent weight of about 400.
[14]Polycaprolactone diol having an equivalent weight of about 200.
[15]Polycaprolactone diol having an equivalent weight of about 1000.
[16]Dicyclohexylmethane-4,4'-diisocyanate available from Bayer Corporation.

After addition of the materials, nitrogen was introduced into the vessel to provide a nitrogen blanket and the agitator was turned on. Heat was applied until the prepolymer reaction mixture reached a temperature of 250° F. (121° C.). Further heating was discontinued. The resulting exothermic reaction usually caused an increase in the temperature of the reaction mixture to about 280° F. (138° C.). If the temperature continued to rise above 280° F. (138° C.), cooling was applied. After the reaction temperature reached about 220° F. (104° C.), the prepolymer product was filtered through a 400 mesh filter. The resulting filtrate was cooled and transferred to a suitable container.

Part B

The following materials were added in the order and the manner described to a reaction injection molding (RIM) machine, such as the Max Mixer available from Max Machines:

| Material | Weight (grams) |
|---|---|
| Charge-1 | |
| Product of Part A | 50.00 |
| Charge-2 | |
| Diethyltoluenediamine | 12.50 |

Charge-1 was added to the container. Charge-2 was added and the contents were rapidly mixed in the Max Mixer.

Part C

The product of Part B was poured into molds measuring 60–80 mm that were treated with an external mold release agent, preheated to 150° C. and placed in an oven at 150° C. for 16 hours. Afterwards, the polymerizates were removed from the molds.

Part D

The following materials were added in the order and the manner described to a container suitable for use with a BRINKMAN PT-3000 homogenizer:

| Material | Weight (grams) |
|---|---|
| Charge-1 | |
| 2-Ethoxy ethyl ether | 30.0 |
| Tetrahydrofurfuryl alcohol | 35.0 |
| n-Methyl pyrrolidone | 20.0 |
| PEG (DGE) | 10.0 |
| Hydroxypropyl cellulose | 12.0 |
| Silica | 0.9 |
| Charge-2 | |
| Photochromic No. 1 | 4.3 |
| Photochromic No. 2 | 1.7 |
| SANDUVOR 3056 UV stabilizer | 1.8 |
| IRGANOX ® 3114 antioxidant | 1.2 |

Charge-1 was added to the container and mixed by the homogenizer at a speed of 5000 rpm for 2 minutes or until the materials were dissolved. Charge-2 was added and the resulting mixture was heated and mixed until the materials were dissolved.

Part E

The solutions of Part D were imbibed into duplicate sample lenses prepared in Part C by applying the imbibition formulation onto the surface of the test lenses by spin coating. The average wet weight of the resin film that formed on the lens ranged from 0.35 to 0.40 milligrams per lens. The resin film was allowed to dry. The lenses were then heated in a hot-air oven at 135–140° C. for 8 hours. After cooling, the resin film was removed from the test samples by rinsing with water and wiping with an acetone soaked tissue.

Comparative Example 4

The procedure of Example 23 was followed except that polyethylene glycol diglycidyl ether was not included in Charge-1 of Part D. The amount of hydroxypropyl cellulose and silica remained the same. The amounts of the other materials were as follows:

| Material | Weight (grams) |
|---|---|
| 2-Ethoxy ethyl ether | 35 |
| Tetrahydrofurfuryl alcohol | 35 |
| n-Methyl pyrrolidone | 20 |

EXAMPLE 24

The procedure of Example 23 was followed except that the following formulation was used in Part A to prepare the prepolymer.

| Material | Number of Equivalents |
|---|---|
| PCLD (400 EW) | 0.75 |
| PCLD (200 EW) | 0.10 |
| Trimethylolpropane | 0.15 |
| DESMODUR W | 2.70 |

Comparative Example 5

The procedure of Example 24 was followed except that polyethylene glycol diglycidyl ether was not included in Charge-1 of Part D. The amount of hydroxypropyl cellulose and silica remained the same. The amounts of the other materials were the same as in Comparative Example 4.

EXAMPLE 25

The procedure of Example 23 was followed except that in Charge-1 of Part D, polyethylene glycol diglycidyl ether (10 grams) was replaced with polycaprolactone diol (PCLD) (6.67 grams) having an number-average molecular weight of 530 and the following materials were used in Charge-2.

| Material | Weight (grams) |
|---|---|
| Photochromic No. 3 | 2.28 |
| Photochromic No. 4 | 0.48 |
| Photochromic No. 5 | 0.54 |
| Photochromic No. 6 | 2.70 |
| TINUVIN ® 144 UV Stabilizer | 2.1 |
| IRGANOX ® 3114 antioxidant | 0.9 |

EXAMPLE 26

The procedure of Example 25 was followed except that in Charge-1 of Part D, polycaprolactone diol was replaced with an equal amount of polyethylene glycol (PEG-900) having an number-average molecular weight of 900.

Comparative Example 6

The procedure of Example 25 was followed except that polycaprolactone diol was not included in Charge-1 of Part D. The amount of hydroxypropyl cellulose and silica remained the same. The amounts of the other materials were the same as in Comparative Example 4.

EXAMPLE 27

The procedure of Example 25 was followed except that the following formulation was used in Part A to prepare the prepolymer.

| Material | Number of Equivalents |
|---|---|
| PCLD (400 EW) | 0.75 |
| PCLD (200 EW) | 0.10 |
| Trimethylolpropane | 0.15 |
| DESMODUR W | 2.70 |

EXAMPLE 28

The procedure of Example 26 was followed except that the following formulation was used in Part A to prepare the prepolymer.

| Material | Number of Equivalents |
|---|---|
| PCLD (400 EW) | 0.75 |
| PCLD (200 EW) | 0.10 |
| Trimethylolpropane | 0.15 |
| DESMODUR W | 2.70 |

Comparative Example 7

The procedure of Example 27 was followed except that polycaprolactone diol was not included in Charge-1 of Part D. The amount of hydroxylpropyl cellulose and silica remained the same. The amounts of the other materials were the same as in Comparative Example 4.

EXAMPLE 29

Part A

Testing of Examples 1–4 and Comparative Example (CE) 1 was done with 2 different sets of sample lenses. The "A" lenses were cast from an optical resin sold by PPG Industries, Inc. under the designation CR-307. The "B" lenses were Spectralite lenses obtained from Sola. In Table 1, the example number is followed by an A or B to indicate which lenses were used. The sample lenses were washed with dishwashing detergent and water, rinsed with deionized water and wiped with an acetone soaked tissue prior to the application of the example solutions. The solutions of Examples 1–4 and Comparative Example 1 were imbibed into the sample lenses by applying a film of the imbibition formulation onto the surface of the test lenses by spin coating. The average wet weight of the resin film ranged from 0.35 to 0.40 milligrams per lens. The applied film was allowed to dry. The lenses were then heated in a hot-air oven at 135–140° C. for 8 hours. After cooling, the resin film was removed from the test samples by rinsing with water and wiping with an acetone soaked tissue.

Examples 5–22 and Comparative Examples 2 and 3 were individually applied to lenses cast from CR-307 monomer. Application of the imbibition solutions of these examples was done in the same way done for the previous examples. Heating of the coated lenses was done for 7 and/or 8 hours as indicated in Table 2.

Part B

The photochromic lenses prepared in Part A and the lenses of Examples 23–28 and Comparative Examples 4–7 were screened for ultraviolet absorbance and lenses having comparable UV absorbance at 390 nanometers were tested for photochromic response on an optical bench. The ultraviolet absorbance value gives an indication of the amount of photochromic compounds in the lens. The optical bench was maintained at a temperature of 72° F. (22° C.). The lenses of Examples 23–28, Comparative Examples 4–7 and the lenses imbibed with Examples 1–4 and Comparative Example 1 were activated for 30 minutes and the ΔOD was measured after the first 30 seconds and then after 15 minutes. Lenses imbibed with Examples 5–22 and Comparative Examples 2 and 3 were activated for 30 minutes and the ΔOD was measured after 15 minutes.

Prior to testing on the optical bench, the photochromic lenses were exposed to 365 nanometer ultraviolet light for about 20 minutes to activate the photochromic compounds and then placed in a 75° C. oven for about 20 minutes to bleach (inactivate) the photochromic compounds. The lenses were then cooled to room temperature, exposed to fluorescent room lighting for at least 3 hours and then kept covered for at least 1 hours prior to testing on an optical bench. The bench was fitted with a 300 watt Xenon arc lamp, a remote controlled shutter, a Schott 3mm KG-2 band-pass filter, which removes short wavelength radiation, neutral density filter(s), a quartz water cell/sample holder for maintaining sample temperature in which the lens to be tested was inserted.

Measurements were made on the optical bench in the Photochromic Performance Test with the power output adjusted to 0.67 milliwatts per square centimeter (mW/cm$^2$). Measurement of the power output was made using a GRASEBY Optronics Model S-371 portable photometer (Serial #21536) with a UV-A detector (Serial # 22411) or comparable equipment. The UV-A detector was placed into the sample holder and the light output was measured. Adjustments to the power output were made by increasing or decreasing the lamp wattage or by adding or removing neutral density filters in the light path.

A monitoring, collimated beam of light from a tungsten lamp was passed through the sample at 30° normal to the surface of the lens. After passing through the lens, the light from the tungsten lamp was directed through a photopic filter attached to a detector. The output signals from the detector were processed by a radiometer. The control of the test conditions and acquisition of data was handled by the Labtech Notebook Pro software and the recommended I/O board.

Change in optical density (ΔOD) from the bleached state to the darkened state was determined by establishing the initial transmittance, opening the shutter from the Xenon lamp to provide ultraviolet radiation to change the test lens from the bleached state to an activated (i.e., darkened) state at selected intervals of time, measuring the transmittance in the activated state, and calculating the change in optical density according to the formula: ΔOD =log(%Tb/%Ta), where %Tb is the percent transmittance in the bleached state, %Ta is the percent transmittance in the activated state and the logarithm is to the base 10.

The Bleach Rate (T 1/2) is the time interval in seconds for the ΔOD of the activated form of the photochromic compound in the coated lenses to reach one half the highest ΔOD after removal of the source of activating light. Results for the photochromic imbibed lenses of Examples 1–4 and Comparative Example 1 are listed in Table 1, of Examples 5–22 and Comparative Examples 2 and 3 are listed in Table 2 and of Examples 23–28 and Comparative Examples 4–7 are listed in Table 3. A column identifying the kinetic enhancing additive (KEA) by the abbreviation used in the examples is included with the Example No. in Tables 2 and 3.

The results of Examples 5–11 should be compared to Comparative Example 2, Examples 12–22 should be compared to Comparative Example 3, Example 23 should be compared to Comparative Example 4, Example 24 should be compared to Comparative Example 5, Examples 25 and 26 should be compared to Comparative Example 6, and Examples 27 and 28 should be compared to Comparative Example 7.

It is important that the substrate of the Comparative Example is from the same batch of material used to produce the substrate of the Examples. This is done to avoid the effects of any variation in the batches on the outcome of the Photochromic Performance Test.

Also included in Tables 1 and 2 is a Performance Rating resulting from the Photochromic Performance Test. The Photochromic Performance Test utilizes the ΔOD at 15 minutes and Bleach Rate results to determine a rating of the photochromic performance. The Performance Rating is calculated by dividing the ΔOD at 15 minutes by the T 1/2 and multiplying the result by 10,000. The higher the Performance Rating, the more kinetically enhanced the photochromic compounds are as compared to the Comparative Examples without the additive of the present invention.

TABLE 1

| Example No. | ΔOD @ 30 seconds | ΔOD @ 15 minutes | T ½ seconds | Performance Rating |
|---|---|---|---|---|
| 1A | 0.13 | 0.48 | 170 | 28.2 |
| 2A | 0.14 | 0.45 | 128 | 35.2 |
| 3A | 0.15 | 0.45 | 116 | 38.8 |
| 4A | 0.15 | 0.41 | 94 | 43.6 |
| CE 1A | 0.12 | 0.49 | 201 | 24.4 |
| 1B | 0.23 | 0.56 | 93 | 60.2 |
| 2B | 0.25 | 0.54 | 81 | 66.7 |
| 3B | 0.26 | 0.53 | 74 | 71.6 |
| 4B | 0.25 | 0.51 | 71 | 71.8 |
| CE 1B | 0.22 | 0.57 | 117 | 48.7 |

TABLE 2

| Example No. (KEA) | Imbibition Time (hrs.) | ΔOD @ 15 minutes | T ½ seconds | Performance Rating |
|---|---|---|---|---|
| 5 (TMPTGE) | 7 | 0.64 | 112 | 57.1 |
| 6 (DGGA) | 7 | 0.61 | 130 | 46.9 |
| 7 (DGTP) | 7 | 0.61 | 130 | 46.9 |
| 8 (PEG(DGE)) | 7 | 0.42 | 102 | 41.2 |
|  | 8 | 0.56 | 120 | 46.7 |
| 9 (PPG(DGE)) | 8 | 0.62 | 155 | 40.0 |
| 10 (PCLD) | 8 | 0.57 | 121 | 47.1 |
| 11 (PEGML) | 8 | 0.57 | 130 | 43.8 |
| CE 2 | 8 | 0.59 | 177 | 33.3 |
| 12 (TMPTGE) | 7 | 0.48 | 73 | 65.8 |
| 13 (GPTGE) | 7 | 0.40 | 84 | 47.6 |
| 14 (DGGA) | 7 | 0.50 | 77 | 64.9 |
| 15 (DGTP) | 7 | 0.53 | 96 | 55.2 |
| 16 (DGCHDC) | 7 | 0.49 | 95 | 51.6 |
| 17 (PEG(DGE)) | 7 | 0.37 | 67 | 55.2 |
|  | 8 | 0.45 | 81 | 55.6 |
| 18 (PCLD) | 8 | 0.43 | 87 | 49.4 |
| 19 (PEG-600) | 8 | 0.45 | 95 | 47.4 |
| 20 (PTHF) | 8 | 0.45 | 90 | 50.0 |
| 21 (PEG-900) | 8 | 0.44 | 81 | 54.3 |
| 22 (PEGDB) | 8 | 0.52 | 97 | 53.6 |
| CE 3 | 8 | 0.55 | 141 | 39.0 |

TABLE 3

| Example No. | ΔOD @ 30 seconds | ΔOD @ 15 minutes | T ½ seconds | Performance Rating |
|---|---|---|---|---|
| 23 (PEG(DGE)) | 0.15 | 0.46 | 162 | 28.4 |
| CE 4 | 0.03 | 0.26 | 1032 | 2.5 |
| 24 (PEG(DGE)) | 0.12 | 0.40 | 206 | 19.4 |
| CE 5 | 0.03 | 0.22 | 1496 | 1.5 |
| 25 (PCLD) | 0.24 | 0.61 | 121 | 50.4 |
| 26 (PEG-900) | 0.13 | 0.41 | 221 | 18.6 |
| CE 6 | 0.07 | 0.43 | 804 | 5.3 |
| 27 (PEG(DGE)) | 0.20 | 0.55 | 147 | 37.4 |
| 28 | 0.08 | 0.28 | 312 | 9.0 |
| CE 7 | 0.05 | 0.33 | >904 | <3.7 |

The results of Table 1 show that the photochromic lenses prepared using either CR-307 monomer resin or Spectralite lenses and the solutions of Examples 1–4 got darker after 30 seconds and faded faster than the photochromic lenses prepared using the solution of CE 1. The Performance Rating for each of the Example treated lenses was higher than that of the Comparative Examples for both types of lenses tested.

The results of Table 2 show that the lenses imbibed with the solutions of Examples 5–11 and 12–22 demonstrated Bleach Rates that were faster and Performance Ratings that were higher than those imbibed with the corresponding Comparative Examples 2 and 3. Also, when the imbibition time was extended from 7 to 8 hours for lenses treated with the solutions of Examples 8 and 17 the performance rating also increased.

The results of Table 3 show that all of the photochromic lenses that were prepared using photochromic imbibition solutions of the present invention in Examples 23–28, got darker after 30 seconds and 15 minutes and faded faster than the photochromic lenses prepared using Comparative Examples 4–7 in the Photochromic Performance Test. The Performance Rating for each of the Example lenses was higher than that of the Comparative Examples.

The present invention has been described with reference to specific details of particular embodiments thereof. It is not intended that such details be regarded as limitations upon the scope of the invention except insofar as to the extent that they are included in the accompanying claims.

We claim:

1. A removable imbibition composition comprising photochromic compound(s) selected from the group consisting of naphthopyrans, quinopyrans, indenonaphthopyrans, phenanthropyrans, benzopyrans, metal dithiozonates, fulgides, fulgimides, and a mixture thereof, and from 0.1 to 99.9 weight percent, based on the total weight of the composition, of kinetic enhancing additive(s) comprising epoxy-containing compound(s), wherein upon the application of the composition to the surface of an organic polymeric article, the photochromic compound(s) and kinetic enhancing additive(s) are transferred into the polymeric article and the residual resin film formed from the composition is removed from the polymeric article.

2. The composition of claim 1 further comprising a carrier of solvent(s), polymeric resin(s) other than the epoxy-containing compound(s), or a mixture thereof, ultraviolet light stabilizer(s), ultraviolet light absorber(s), antioxidant(s), rheology control agent(s), leveling agent(s) or a mixture thereof.

3. The composition of claim 1 wherein the kinetic enhancing additive is present in an amount of from 1 to 75 weight percent, based on the total weight of the composition.

4. The composition of claim 1 wherein the amount of kinetic enhancing additive added is an amount that results in at least a 10 percent improvement in the Photochromic Performance Test when compared to a similar composition for the imbibition process without said kinetic enhancing additive.

5. The composition of claim 1 wherein the kinetic enhancing additive is epoxy-containing compound(s) represented by graphic formulae I, II, III or a mixture thereof:

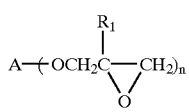

I

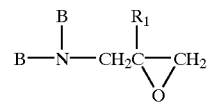

II

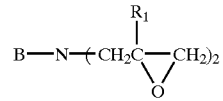

III wherein
(i) $R_1$ is hydrogen or $C_1$–$C_3$ alkyl;
(ii) n is the integer one, two, three or four; when n is one, A is $C_2$–$C_{20}$ alkyl, substituted $C_2$–$C_{20}$ alkyl, $C_3$–$C_{20}$ cycloalkyl, substituted C₃–C₂₀ cycloalkyl; the unsubstituted or substituted aryl groups, phenyl and naphthyl; aryl(C₁–C₃)alkyl, substituted aryl(C₁–C₃)alkyl, acryloxy, methacryloxy; the group —C(O)Y, wherein Y is $C_2$–$C_{20}$ alkyl, $C_1$–$C_6$ alkoxy or aryl; or the group —R—(OR)$_m$—OH or —(OR)$_m$—OH, wherein R is $C_2$–$C_4$ alkylene and m is an integer from 1 to 20; said alkyl and cycloalkyl substituents being carboxy, hydroxy or $C_1$–$C_3$ alkoxy, said aryl and aryl($C_1$–$C_3$) alkyl substituents being carboxy, hydroxy, $C_1$–$C_3$ alkoxy or $C_1$–$C_3$ alkyl; or when n is from two to four, A is $C_2$–$C_{20}$ alkylene, substituted $C_2$–$C_{20}$ alkylene, $C_3$–$C_{20}$ cycloalkylene, substituted $C_3$–$C_{20}$ cycloalkylene; the unsubstituted or substituted arylene groups, phenylene and naphthylene; aryl($C_1$–$C_3$)alkylene, substituted aryl($C_1$–$C_3$)alkylene; the group —C(O)Z(O)C— wherein Z is $C_2$–$C_{20}$ alkylene or arylene; the group —R—(OR)$_m$— or —(OR)$_m$—, wherein R and m are the same as defined hereinbefore; phthaloyl, isophthathoyl, terephthaloyl; hydroxyl-substituted phthaloyl, hydroxy-substituted isophthaloyl, hydroxy-substituted terephthaloyl; or a group represented by the following graphic formula:

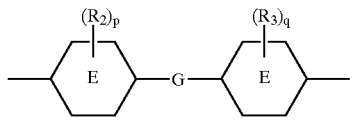

wherein R₂ and R₃ are each C₁–C₄ alkyl, chlorine or bromine; p and q are each an integer from 0 to 4;

represents a divalent benzene group or a divalent cyclohexane group; G is —O—, —S—, —S(O₂)—, —C(O)—, —CH₂—, —CH=CH—, —C(CH₃)₂—, —C(CH₃)(C₆H₅)—, —(C₆H₄)— or

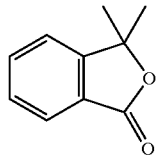

when

is the divalent benzene group; or G is —O—, —S—, —CH₂—, or —C(CH₃)₂—, when

is the divalent cyclohexane group; said alkylene and cycloalkylene substituents being carboxy, hydroxy or C₁–C₃ alkoxy; said arylene and aryl(C₁–C₃)alkylene substituents being carboxy, hydroxy, C₁–C₃ alkoxy or C₁–C₃ alkyl; and (iii) B is $C_2$–$C_{20}$ alkyl, substituted $C_2$–$C_{20}$ alkyl, $C_3$–$C_{20}$ cycloalkyl, substituted $C_3$–$C_{20}$ cycloalkyl; the unsubstituted or substituted aryl groups, phenyl and naphthyl; aryl($C_1$–$C_3$)alkyl or substituted aryl($C_1$–$C_3$)alkyl; said alkyl and cycloalkyl substituents being carboxy, hydroxy or $C_1$–$C_3$ alkoxy, said aryl and aryl($C_1$–$C_3$) alkyl substituents being carboxy, hydroxy, $C_1$–$C_3$ alkoxy or $C_1$–$C_3$ alkyl.

6. The composition of claim 5 wherein R₁ is hydrogen; A is $C_2$–$C_{10}$ alkyl, phenyl, —R—(OR)$_m$—OH or —(OR)$_m$—OH, wherein R is $C_2$–$C_4$ alkylene and m is an integer from 1 to 20, when n is one; or when n is from two to four, A is selected from $C_2$–$C_{10}$ alkylene, phenylene, —R—(OR)$_m$— or —(OR)$_m$—, wherein R and m are the same as defined hereinbefore; or phthaloyl; B is selected from $C_2$–$C_{10}$ alkyl, phenyl or phenyl($C_1$–$C_3$)alkyl.

7. The composition of claim 5 wherein the epoxy-containing compound is ethylene glycol glycidyl ether, propylene glycol glycidyl ether, glycerol polyglycidyl ether, diglycerol polyglycidyl ether, glycerol propoxylate triglycidyl ether, trimethylolpropane triglycidyl ether, sorbitol polyglycidyl ether, butyl glycidyl ether, phenyl glycidyl ether, poly(ethylene glycol)diglycidyl ether, poly(propylene glycol)diglycidyl ether, neopentyl glycol diglycidyl ether, N,N-diglycidyl-4-glycidyloxyaniline, glycidyl phthalimide, N,N'-diglycidyltoluidine, 1,6-hexane diol diglycidyl ether, diglycidyl 1,2-cyclohexanedicarboxylate, bisphenol A or hydrogenated bisphenol A propylene oxide adduct, diglycidyl ester of terephthalic acid, diglycidyl 1,2,3,6-tetrahydrophthalate, spiroglycoldiglycidyl ether, hydroquinone diglycidyl ether or a mixture thereof.

8. The composition of claim 7 wherein the epoxy-containing compound is polyethylene glycol diglycidyl ether, trimethylol propane triglycidyl ether, N,N-diglycidyl-4-glycidyloxyaniline, diglycidyl-1,2,3,6-tetrahydrophthalate, glycerol propoxylate triglycidyl ether, diglycidyl-1,2-cyclohexane dicarboxylate or a mixture thereof.

9. The composition of claim 1 wherein the photochromic compound(s) have at least one activated absorption maxima within the range of 400 and 700 nanometers.

10. The composition of claim 2 wherein the carrier is water, benzene, toluene, methyl ethyl ketone, acetone, ethanol, tetrahydrofurfuryl alcohol, n-methyl pyrrolidone, 2-ethoxyethyl ether, 2-methoxyethyl ether, xylene, cyclohexane, 3-methyl cyclohexanone, ethyl acetate, tetrahydrofuran, methanol, methyl propionate, ethylene glycol, hydroxy(C₁–C₃)alkyl cellulose, poly(vinyl pyrrolidone), polyvinyl chloride, polyvinyl acetate, polyvinyl butyral, polyvinyl propionate, cellulose acetate butyrate or a mixture thereof.

* * * * *